United States Patent
Chen et al.

[19]

[11] Patent Number: 5,842,210
[45] Date of Patent: Nov. 24, 1998

[54] METHOD AND APPARATUS FOR SELECTIVELY RETRIEVING DATA FROM A DATABASE IN A DATA COMMUNICATION SYSTEM

[75] Inventors: Xuming Chen, North Richland Hills; W. Garland Phillips, Arlington; Alain C. Briancon, McKinney; Terence Edward Sumner, Azle, all of Tex.

[73] Assignee: Motorola, Inc.

[21] Appl. No.: 741,482

[22] Filed: Oct. 30, 1996

[51] Int. Cl.⁶ .................................................. G06F 17/30
[52] U.S. Cl. ...................... 707/10; 707/104; 340/825.44; 455/418; 379/67
[58] Field of Search ................ 340/825.44; 370/278; 455/412, 426, 418; 379/67; 707/10, 2, 104

[56] References Cited

U.S. PATENT DOCUMENTS

| | | | |
|---|---|---|---|
| 5,361,399 | 11/1994 | Linquist et al. | 455/412 |
| 5,515,365 | 5/1996 | Sunmer et al. | 370/278 |
| 5,526,401 | 6/1996 | Roach, Jr. et al. | 455/426 |
| 5,530,905 | 6/1996 | Nichols et al. | 395/200.57 |
| 5,546,444 | 8/1996 | Roach, Jr. et al. | 455/412 |
| 5,671,436 | 9/1997 | Morris et al. | 707/10 |
| 5,686,901 | 11/1997 | Chen | 340/825.44 |
| 5,742,668 | 4/1998 | Pepe et al. | 379/67 |
| 5,754,953 | 5/1998 | Briancon et al. | 455/418 |

OTHER PUBLICATIONS

Daniel Gilly, UNIX in a Nutshell, 2–71, Aug. 1994, U.S.A.

Primary Examiner—Thomas G. Black
Assistant Examiner—Charles L. Rones
Attorney, Agent, or Firm—R. Louis Breeden

[57] ABSTRACT

In a data communication system a first controller (102) selectively retrieves data from a database (316) in a second controller (106). Data corresponding to a plurality of entities is programmed (602) into the database. The data includes a plurality of parameters for each of the plurality of entities. Ones of the plurality of parameters are selectively defined (604) to belong to parameter groups in accordance with a predetermined grouping plan. The first controller generates (612) a request for the data corresponding to one of the plurality of entities from the database, the request further indicating a desired one of the parameter groups. The second controller returns (620) the desired one of the parameter groups corresponding to the one of the plurality of entities, in response to the request.

19 Claims, 5 Drawing Sheets

102

106

400

500

600

700

800

900

METHOD AND APPARATUS FOR SELECTIVELY RETRIEVING DATA FROM A DATABASE IN A DATA COMMUNICATION SYSTEM

FIELD OF THE INVENTION

This invention relates in general to data communication systems, and more specifically to a method and apparatus for selectively retrieving data from a database.

BACKGROUND OF THE INVENTION

A wide area messaging system typically includes a plurality of home controllers and can receive message originations at a plurality of input controllers. In prior art systems, when an input controller receives a message intended for a subscriber, and the input controller is not the home controller for the subscriber, then the input controller must determine the address of the home controller, e.g., by locating a predetermined portion of the subscriber number in a home address lookup table. The input controller then communicates with the home controller to obtain the information contained in a database of the home controller for the subscriber in order to validate the subscriber. Prior art systems typically have communicated all the information that could possibly be of use in processing the message or that could be of interest to the caller, including type of subscriber unit, service status, barring, the registered location of the subscriber, and legitimization information, to name a few types of information. Once the information has been obtained, the input controller continues to process the message, e.g., by sending the message to an output controller for transmission to the subscriber.

A problem with the prior art approach to subscriber validation is the large amount of network traffic that can be generated by the validation communications. The problem is worsened by the fact that the prior art systems typically send more information than the basic information needed to validate the subscriber and process the call. In addition, prior art systems have made no attempt to store validation information in the input controller, resulting in repeated communication of validation information which has not changed since the last communication. Thus, what is needed is a method and apparatus that can reduce the validation traffic in a data communication system through a selective retrieval process. The method and apparatus preferably will minimize the amount of information sent for validation, as well as minimizing the number of repeated communications of validation information which has not changed.

SUMMARY OF THE INVENTION

An aspect of the present invention is a method in a data communication system having an input controller for receiving a message from a message originator, the input controller coupled to a home controller through a network. The method is for selectively retrieving, by the input controller, data from a database in the home controller. The method comprises the steps of programming the data corresponding to a plurality of subscribers into the database, the data comprising a plurality of parameters for each of the plurality of subscribers; and selectively defining ones of the plurality of parameters to belong to parameter groups identified by parameter group identifiers. The method further comprises the steps of generating, by the input controller in response to receiving the message, a request for the data corresponding to one of the plurality of subscribers from the database, the request further indicating a desired one of the parameter groups; and returning, from the home controller, the desired one of the parameter groups corresponding to the one of the plurality of subscribers, in response to the request. The method also includes the step of storing the data retrieved in a memory of the input controller for a predetermined time, thereby creating a temporary database.

Another aspect of the present invention is an input controller in a data communication system for receiving a message from a message originator, and for selectively retrieving data from a database in a home controller coupled to the input controller through a network. The data programmed into the database corresponds to a plurality of subscribers and comprises a plurality of parameters for each of the plurality of subscribers. The input controller comprises a communication interface for conducting communications with the home controller; and a processing system coupled to the communication interface for processing the communications, the processing system including a memory. The processing system is programmed to selectively define ones of the plurality of parameters to belong to parameter groups identified by parameter group identifiers; and to generate, in response to receiving the message, a request for the data corresponding to one of the plurality of subscribers from the database, the request further indicating a desired one of the parameter groups. The processing system is further programmed to receive, from the home controller, the desired one of the parameter groups corresponding to the one of the plurality of subscribers, in response to the request; and to store the data retrieved in the memory for a predetermined time, thereby creating a temporary database.

Another aspect of the present invention is a home controller in a data communication system having an input controller for receiving a message from a message originator, the input controller coupled to the home controller through a network. The input controller is for selectively retrieving data from a database in the home controller. The data programmed into the database corresponds to a plurality of subscribers, and comprises a plurality of parameters for each of the plurality of subscribers. The home controller comprises a communication interface for conducting communications with the input controller; and a processing system coupled to the communication interface for processing the communications, the processing system including a first memory for storing the database. The processing system is programmed to selectively define ones of the plurality of parameters to belong to parameter groups identified by parameter group identifiers; and to receive from the input controller, in response to receiving the message, a request for the data corresponding to one of the plurality of subscribers, the request further indicating a desired one of the parameter groups. The processing system is further programmed to send, to the input controller, the desired one of the parameter groups corresponding to the one of the plurality of subscribers, in response to the request. The desired one of the parameter groups is to be stored in a second memory in the input controller for a predetermined time, thereby creating a temporary database.

DETAILED DESCRIPTION OF THE DRAWINGS

Figure 1:
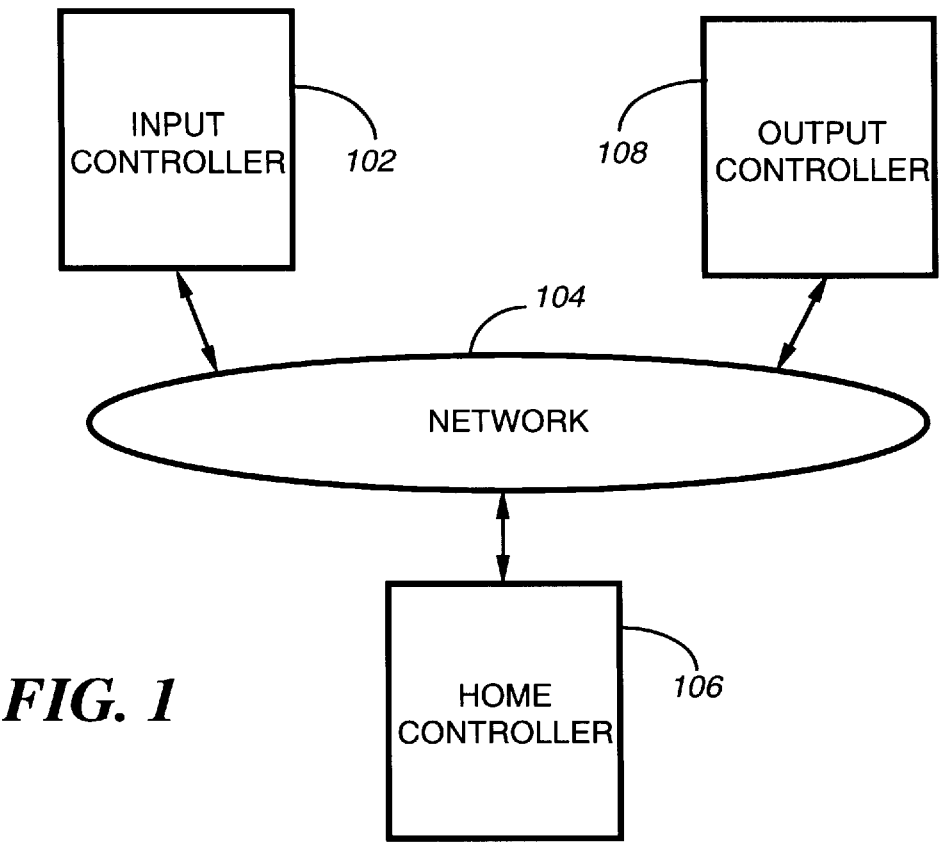
FIG. 1 is an electrical block diagram of a data communication system in accordance with the present invention.

Referring to FIG. 1, an electrical block diagram of a data communication system in accordance with the present invention comprises an input controller 102 for receiving a message from a message originator using well-known techniques. The input controller 102 is coupled through a network 104 to a home controller 106, which comprises a database including data used in validating and controlling the distribution of the message. The data communication system preferably also includes an output controller 108 for outputting the message to a subscriber through a conventional radio medium. The hardware of the input and home controllers 102, 106 is preferably similar to that of the Wireless Messaging Gateway (WMG™) Administrator! paging controller, while the hardware of the output controller 108 is preferably similar to that of the RF-Conductor!™ message distributor, all manufactured by Motorola, Inc. of Schaumburg, Ill. The controllers 102, 106, 108 preferably communicate with one another by utilizing a well-known protocol, e.g., the Wireless Messaging Telocator Protocol (WMtp™) or the InterPaging Networking Protocol (IPNP). The network 104 is preferably a conventional packet switched data network. It will be appreciated that in a large data communication system there can be many input controllers 102, home controllers 106, and output controllers 108.

Figure 2:
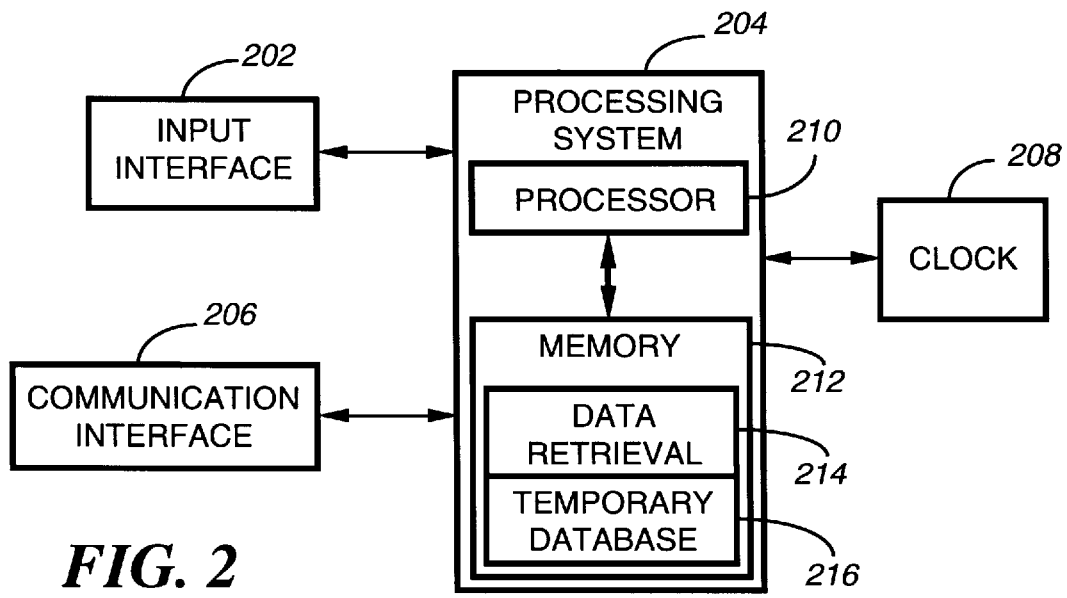
FIG. 2 is an electrical block diagram of an input controller in accordance with the present invention.

FIG. 2 is an electrical block diagram of the input controller 102 in accordance with the present invention. The input controller 102 comprises a conventional input interface 202 for accepting the message from the message originator, e.g., through a public switched telephone network. The input interface 202 is coupled to a processing system 204 for processing the message and directing the operation of the input controller 102. The processing system 204 is also coupled to a communication interface 206 for communicating with the home controller 106 through the network 104. A clock 208 is also coupled to the processing system 204 for providing a time signal thereto. The processing system 204 comprises a conventional processor 210, which is programmed by way of software stored in a conventional memory 212. More specifically, the memory 212 includes a data retrieval element 214 for selectively retrieving data from the home controller 106 in accordance with the present invention. The processing system 204 stores the retrieved data in the memory 212 for a predetermined time, thereby creating a temporary database 216.

The data retrieval element 214 preferably programs the processing system 204 to selectively define parameters programmed into a database 316 (FIG. 3) of the home controller 106 to belong to parameter groups in accordance with a predetermined grouping plan, and, in response to a stimulus such as a message, to generate a request for data corresponding to one of a plurality of entities (e.g., a subscriber) from the database 316, the request further indicating a desired one of the parameter groups. The data retrieval element 214 further programs the processing system 204 to receive, from the home controller 106, the desired one of the parameter groups corresponding to the one of the plurality of entities, in response to the request. By limiting the parameters communicated to the minimum required, the network traffic is advantageously reduced.

The data retrieval element 214 also programs the processing system 204 to receive version information corresponding to the desired one of the parameter groups from the home controller 106, and to store in the memory 212, for a predetermined time, the data and the corresponding version information, e.g., a time the data was last changed, received from the home controller, thereby creating the temporary database 216. In addition, the data retrieval element 214 programs the processing system 204 to send the version information corresponding to the data requested in the request, when a version of the data is determined to be stored in the memory 212.

As an additional feature of the input controller, the data retrieval element 214 programs the processing system 204 to store in the memory 212 a time of a receipt of a response to the request for the data corresponding to one of the plurality of entities, and to disallow a generation of a request for identical data corresponding to the one of the plurality of entities when less than a predetermined time has elapsed since the time of the receipt of the response. This feature advantageously reduces repeated communication of data which has not had sufficient time to have changed since a last transmission.

Figure 3:
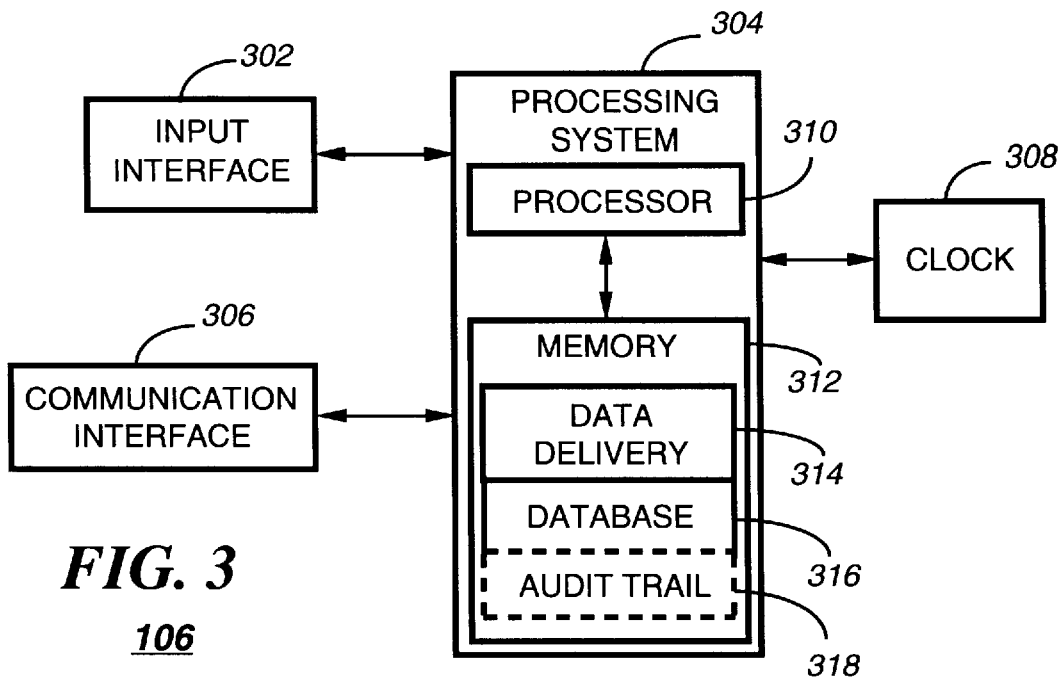
FIG. 3 is an electrical block diagram of a home controller in accordance with the present invention.

FIG. 3 is an electrical block diagram of the home controller 106 in accordance with the present invention. The home controller 106 is similar to the input controller 102 and comprises an input interface 302, a processing system 304, a communication interface 306 and a clock 308. These elements are similar to the corresponding elements 202, 204, 206, and 208 in the input controller 102. The processing system 304 comprises a conventional processor 310, which is programmed by way of software stored in a memory 312. More specifically, the memory 312 includes a data delivery element 314 for cooperating with the input controller 102 to selectively deliver data to the input controller 102 in accordance with the present invention. The processing system 304 delivers the data from the database 316 in the memory 312. The data delivery element 314 preferably programs the processing system 304 to selectively define ones of a plurality of parameters stored in the database 316 to belong to parameter groups in accordance with a predetermined grouping plan, and to receive from the input controller 102 a request for data corresponding to one of a plurality of entities, the request further indicating a desired one of the parameter groups. The data delivery element 314 further programs the processing system 304 to send, to the input controller 102, the desired one of the parameter groups corresponding to the one of the plurality of entities, in response to the request. This process advantageously minimizes the amount of data required to be communicated.

In addition, the data delivery element 314 programs the processing system 304 to return version information corresponding to the desired one of the parameter groups to the input controller 102, in response to the request, and to receive the version information corresponding to the data requested in the request, when the version information is available in the input controller 102. The data delivery element 314 also programs the processing system 304 to send a message to the input controller 102 indicating that the version has not changed, in response to the version of the data stored in the memory 312 of the home controller 106 being equal to the version of the data requested in the request. This process advantageously eliminates repeated communication of data already stored in the input controller 102 when the version of the data has not changed.

In an alternative embodiment of the home controller 106 the memory 312 includes an audit trail element 318 for maintaining an audit trail of data exchanges in accordance with the present invention. The audit trail element 318 programs the processing system 304 to store in the memory 312 an audit trail including version information for the data returned to the input controller and an identifier corresponding to the input controller, in response to responding to the request. The audit trail element 318 further programs the processing system to compare a subsequent request with the audit trail, and to negate sending the data requested in the subsequent request, in response to the subsequent request being for data which the audit trail indicates was previously returned to the first controller when the version information for the data currently in the second controller is equal to the version information stored in the audit trail. The audit trail element 318 thus advantageously eliminates repeated communication of data already sent to the input controller 102 when the version of the data has not changed.

Figure 4:
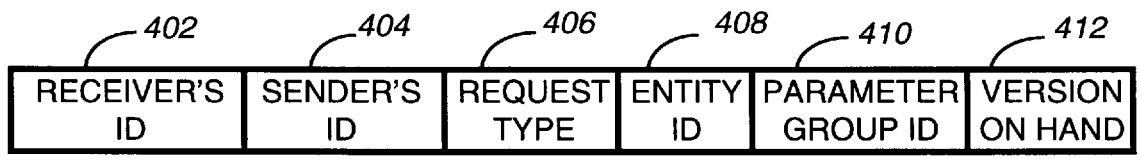
FIG. 4 is a protocol diagram depicting a data request message in accordance with the present invention.

FIG. 4 is a protocol diagram depicting a data request message 400 in accordance with the present invention. The data request message 400 preferably includes a receiver's identification (ID) 402, e.g., the address of the home controller 106 having information about the entity for whom the message is intended. The data request message 400 further includes a sender's ID 404, e.g., the address of the input controller 102 sending the request. In addition, the data request message 400 includes a request type 406 for defining the type of request, e.g., validation, feature change, location change. The data request message 400 also includes an entity ID 408, e.g., a subscriber personal identification number (PIN). The data request message 400 further comprises a parameter group ID 410 for designating the desired parameter group, and a version on hand indicator 412 for indicating the version of the data (if any) stored in the input controller 102. It will be appreciated that, alternatively, the field containing the parameter group ID 410 can be eliminated and the desired parameter group implicitly indicated by the request type 406.

Figure 5:
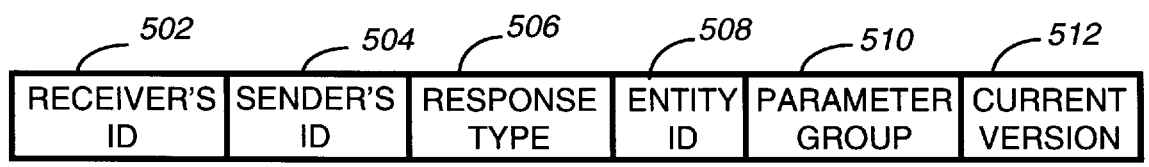
FIG. 5 is a protocol diagram depicting a data response message in accordance with the present invention.

FIG. 5 is a protocol diagram depicting a data response message 500 in accordance with the present invention. The data response message 500 preferably includes a receiver's ID 502, e.g., the address of the input controller 102 to which the response message 500 is directed. The data response message 500 further includes a sender's ID 504, e.g., the address of the home controller 106 sending the response. In addition, the data response message 500 includes a response type 506 for designating the type of response, e.g., requested data, version OK, feature changed. The data response message 500 further comprises an entity ID 508 for identifying the subscriber. Also included is the parameter group 510, i.e., the requested data, if data is being returned. In addition, the data response message 500 includes a current version indicator 512 for indicating the current version of the data. It will be appreciated that, optionally, the data response message 500 can include version information for additional parameter groups associated with the entity, ID 508.

Figure 6:
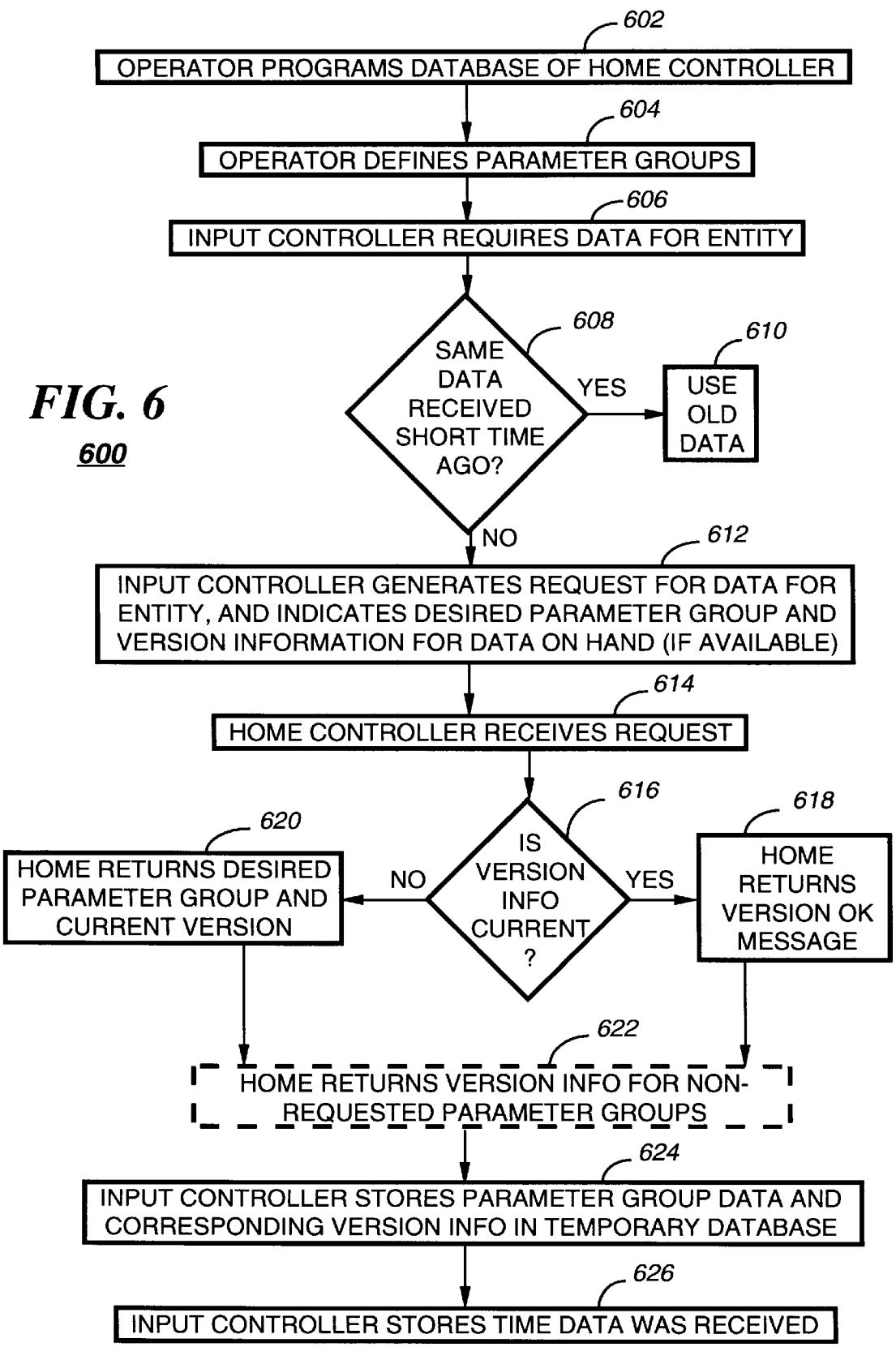
FIG. 6 is a flow chart depicting a selective data retrieval operation in accordance with the preferred embodiment of the present invention.

FIG. 6 is a flow chart depicting a selective data retrieval operation in accordance with the preferred embodiment of the present invention. First, the system operator programs 602 the database 316 of the home controller 106 with the subscriber information. Then the system operator defines 604 the parameter groups that will be utilized in the system. Next, the input controller 102 determines 606 that it requires data for an entity. For example, the input controller 102 has received a message for the entity and needs to validate the entity. The input controller first checks 608 whether the same data was received from the home controller 106 less than a predetermined time ago. If so, the input controller will use 610 the old data, as it has not had sufficient time to be changed.

If, on the other hand, the same data was not received from the home controller 106 less than the predetermined time ago, then the input controller 102 generates 612 a request for data for the entity. The request indicates the desired parameter group and, if available, the version information for the corresponding data on hand in the input controller 102. The home controller 106 receives 614 the request and checks 616 whether the version information (if available) is current. If so, the home controller 106 returns 618 a message indicating that the version in the input controller 102 is OK. If, on the other hand, the version information in the request is not current or is not available, then the home controller returns 620 the desired parameter group data and the current version information. In either case, the home controller 106 can optionally return 622 current version information for additional non-requested parameter groups. The input controller 102 then stores 624 any parameter group data and corresponding version information received in the temporary database 216. The input controller also preferably stores 626 in the temporary database 216 the time at which the data was received. This method of operation advantageously reduces network traffic by limiting the data requested to the parameters essential for the type of request, and further by eliminating repeated communications of the same data when the data stored in the input controller 102 is current.

Figure 7:
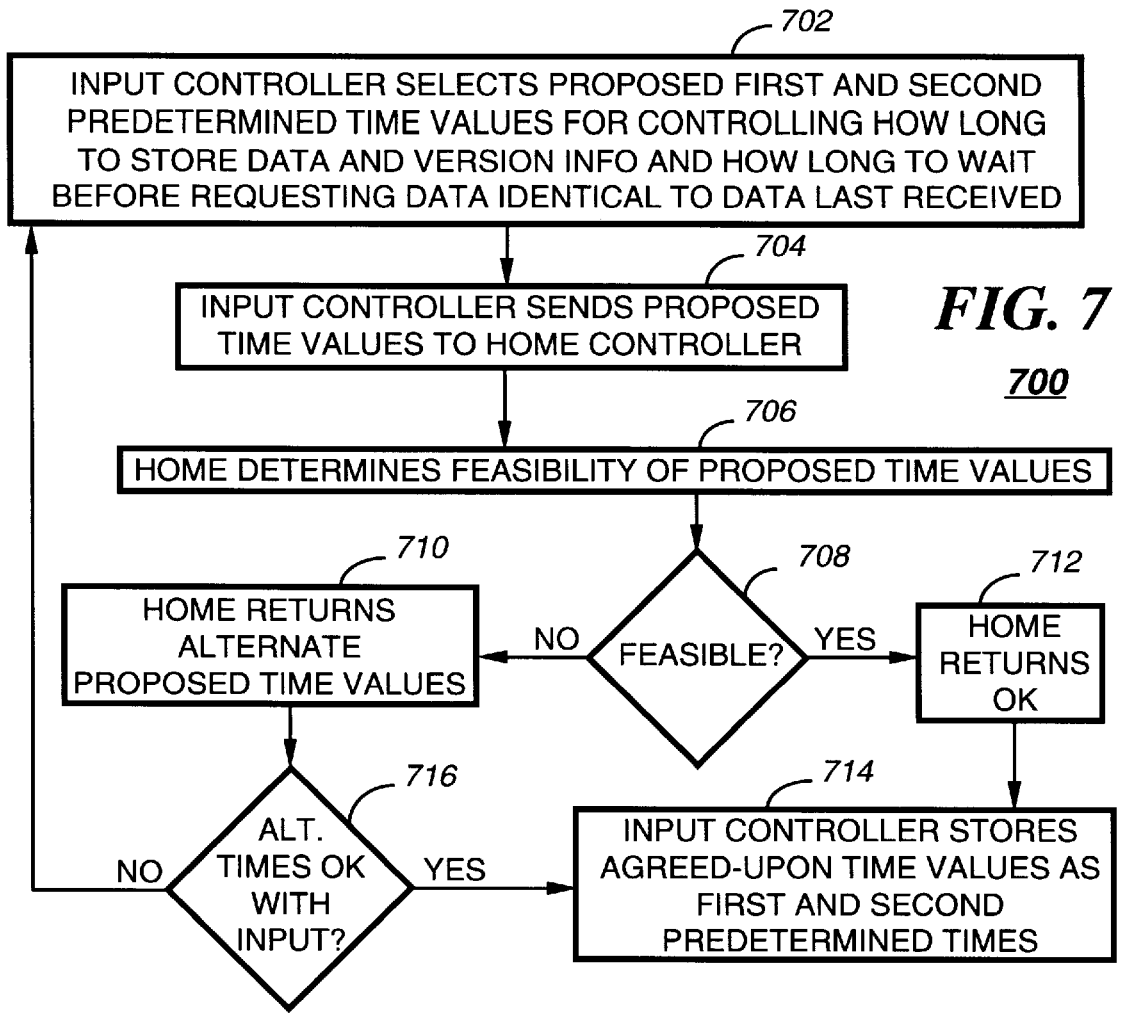
FIG. 7 is a flow chart depicting a negotiation between the input and home controllers to set predetermined time values in accordance with the present invention.

FIG. 7 is a flow chart 700 depicting a negotiation between the input and home controllers 102, 106 to set predetermined time values in accordance with the present invention. The flow chart 700 begins with the input controller 102 selecting 702 proposed first and second predetermined time values for controlling how long to store the data and version information and how long to wait before requesting data identical to that last received. The input controller 102 then sends 704 the proposed time values to the home controller 106. The home controller then determines 706 the feasibility of the proposed time values. If in step 708 the time values are determined to be feasible, then the home controller 106 returns 712 a message indicating that the values are OK. The input controller 102 then stores 714 the agreed-upon time values as first and second predetermined times for controlling how long to store the data and version information and how long to wait before requesting data identical to that last received. If, on the other hand, at step 708 the home controller 106 does not find the time values feasible, then the home controller 106 returns 710 alternate proposed time values. If in step 716 the alternate time values are OK with the input controller 102, then the input controller goes to step 714 to store the values. If not OK, the input controller returns to step 702 to propose new time values. In this manner the input and home controllers 102, 106 advantageously can negotiate the time values until time values satisfactory to both controllers are determined.

Figure 8:
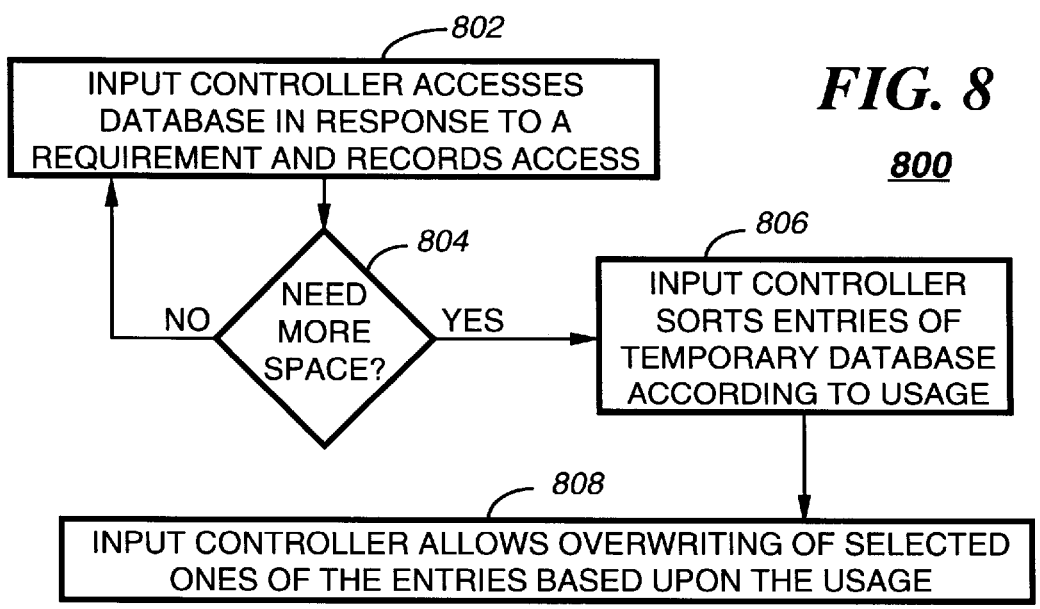
FIG. 8 is a flow chart depicting a sort and overwrite operation in accordance with the present invention.

FIG. 8 is a flow chart 800 depicting a sort and overwrite operation in accordance with the present invention. The flow begins with the input controller 102 accessing 802 the database 316 and preparing to write the accessed information into the temporary database 216. If in step 804 the input controller determines that more space is needed in the memory 212 for storing the information, then the input controller 102 sorts 806 the entries of the temporary database 216 according to usage. For example, the input controller 102 can keep a tally for each entry to indicate how many messages have been received for the corresponding subscriber during the last 12 hours. The temporary database 216 can then be sorted on the basis of messages received. Next, the input controller allows 808 overwriting of selected ones of the entries based upon the usage. For example, entries having less than 1 message in the last 12 hours could be overwritten.

Figure 9:
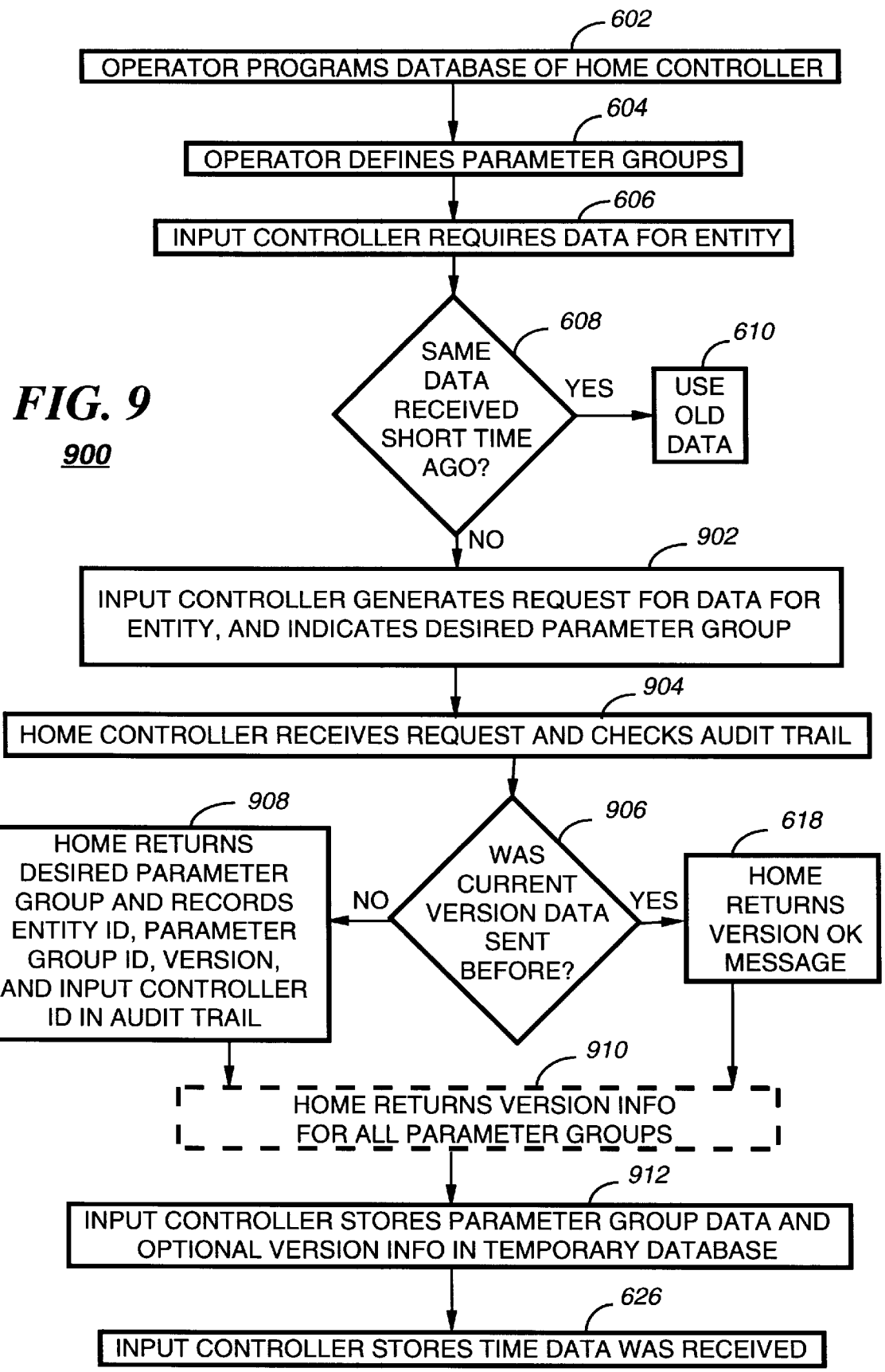
FIG. 9 is a flow chart depicting a selective data retrieval operation in accordance with an alternative embodiment of the present invention.

FIG. 9 is a flow chart 900 depicting a selective data retrieval operation in accordance with an alternative embodiment of the present invention. The flow chart 900 is similar to the flow chart 600, the essential differences being steps 902 through 912, which follow after a NO response to step 608. In step 902 the input controller 102 generates a request for data for an entity, and indicates a desired parameter group, but does not send version information for data on hand. The home controller 106 then receives 904 the request and checks the audit trail 318 stored in the home controller 106. In step 906 the home controller checks 906 whether the current version of the data requested has been sent to the input controller before. If so, the home controller returns 618 a message indicating that the version stored in the input controller is OK. If not, the home controller returns 908 the desired parameter group and records entity ID, parameter group ID, version, and input controller ID in the audit trail. In either case, the home controller 106 can optionally return 910 current version information for all the parameter groups. The input controller 102 then stores 912 any parameter group data and optional version information received in the temporary database 216. The input controller also preferably stores 626 in the temporary database 216 the time at which the data was received. This process advantageously reduces network traffic by limiting the data requested to the parameters essential for the type of request, and further by eliminating repeated communications of the same data when the data stored in the input controller 102 is current.

Thus, it should be apparent by now that the present invention provides a method and apparatus that can reduce the validation traffic in a data communication system through a selective retrieval process. The method and apparatus advantageously minimizes the amount of information sent for validation, as well as minimizing the number of repeated communications of validation information which has not changed.

What is claimed is:

1. A method in a data communication system having an input controller for receiving a message from a message originator, the input controller coupled to a home controller through a network, the method for selectively retrieving, by the input controller, data from a database in the home controller, the method comprising the steps of:

programming the data corresponding to a plurality of subscribers into the database, the data comprising a plurality of parameters for each of the plurality of subscribers;

selectively defining ones of the plurality of parameters to belong to parameter groups identified by parameter group identifiers;

generating, by the input controller in response to receiving the message, a request for the data corresponding to one of the plurality of subscribers from the database, the request further indicating a desired one of the parameter groups;

returning, from the home controller, the desired one of the parameter groups corresponding to the one of the plurality of subscribers, in response to the request; and storing the data retrieved in a memory of the input controller for a predetermined time, thereby creating a temporary database.

2. The method of claim 1, wherein in the generating step the request itself implicitly indicates the desired one of the parameter groups.

3. The method of claim 1, wherein in the generating step the request explicitly indicates the desired one of the parameter groups in a field.

4. The method of claim 1, wherein the returning step comprises the step of including version information corresponding to the desired one of the parameter groups, and wherein the storing step comprises the step of storing the data and the corresponding version information retrieved from the home controller; and wherein the generating step includes the step of sending the version information corresponding to the data requested in the request, when a version of the data is determined to be stored in the input controller.

5. The method of claim 4, wherein the returning step is negated in response to the version of the data stored in the home controller being equal to the version of the data requested in the request.

6. The method of claim 4, wherein, in response to the version of the data stored in the home controller being equal to the version of the data requested in the request, the returning step is negated, and the method further comprises the step of sending a message to the input controller indicating that the version has not changed.

7. The method of claim 4, further comprising the step of negotiating between the input and home controllers to determine a value for the predetermined time.

8. The method of claim 4, further comprising the steps of:

sorting entries of the temporary database according to usage; and allowing overwriting of selected ones of the entries based upon the usage, in response to additional storage space being needed for the temporary database.

9. The method of claim 4, further comprising the step of transmitting version information corresponding to at least one of the parameter groups, in response to the request.

10. The method of claim 1, further comprising the steps of:

storing, by the input controller, a time of a receipt of a response to the request for the data corresponding to one of the plurality of subscribers, and disallowing, by the input controller, a repeat of the generating step for requesting identical data corresponding to the one of the plurality of subscribers when less than a predetermined time has elapsed since the time of the receipt of the response.

11. The method of claim 10, further comprising the step of negotiating between the input and home controllers to determine a value for the predetermined time.

12. The method of claim 1, further comprising the steps of:

storing, in the home controller, an audit trail including version information for the data returned to the input controller and an identifier corresponding to the input controller, in response to executing the returning step; and comparing the request with the audit trail, wherein the returning step is negated, in response to the request being for data which the audit trail indicates was previously returned to the input controller when the version information for the data currently in the home controller is equal to the version information stored in the audit trail.

13. The method of claim 12, further comprising the step of transmitting the version information corresponding to at least one of the parameter groups, in response to the request.

14. An input controller in a data communication system for receiving a message from a message originator, and for selectively retrieving data from a database in a home controller coupled to the input controller through a network, wherein the data programmed into the database corresponds to a plurality of subscribers, and wherein the data comprises a plurality of parameters for each of the plurality of subscribers, the input controller comprising:

a communication interface for conducting communications with the home controller; and a processing system coupled to the communication interface for processing the communications, the processing system including a memory, wherein the processing system is programmed to:
selectively define ones of the plurality of parameters to belong to parameter groups identified by parameter group identifiers;
generate, in response to receiving the message, a request for the data corresponding to one of the plurality of subscribers from the database, the request further indicating a desired one of the parameter groups;
receive, from the home controller, the desired one of the parameter groups corresponding to the one of the plurality of subscribers, in response to the request; and
store the data retrieved in the memory for a predetermined time, thereby creating a temporary database.

15. The input controller of claim 14, wherein the processing system is further programmed to:

receive version information corresponding to the desired one of the parameter groups from the home controller;
store in the memory the data and the corresponding version information received from the home controller; and
send the version information corresponding to the data requested in the request, when a version of the data is determined to be stored in the memory.

16. The input controller of claim 14, wherein the processing system is further programmed to:

store, in the memory a time, of a receipt of a response to the request for the data corresponding to one of the plurality of subscribers; and
disallow a generation of a request for identical data corresponding to the one of the plurality of subscribers when less than a predetermined time has elapsed since the time of the receipt of the response.

17. A home controller in a data communication system having an input controller for receiving a message from a message originator, the controller coupled to the home controller through a network, the input controller for selectively retrieving data from a database in the home controller, wherein the data programmed into the database corresponds to a plurality of subscribers, and wherein the data comprises a plurality of parameters for each of the plurality of subscribers, the home controller comprising:

a communication interface for conducting communications with the input controller; and a processing system coupled to the communication interface for processing the communications, the processing system including a first memory for storing the database, wherein the processing system is programmed to:
selectively define ones of the plurality of parameters to belong to parameter groups identified by parameter group identifiers;
receive from the input controller, in response to receiving the message, a request for the data corresponding to one of the plurality of subscribers, the request further indicating a desired one of the parameter groups, and
send, to the input controller, the desired one of the parameter groups corresponding to the one of the plurality of subscribers, in response to the request, wherein the desired one of the parameter groups is to be stored in a second memory in the input controller for a predetermined time, thereby creating a temporary database.

18. The home controller of claim 17, wherein the processing system is further programmed to:

return version information corresponding to the desired one of the parameter groups to the input controller, in response to the request;
receive the version information corresponding to the data requested in the request, when available in the input controller; and
send a message to the input controller indicating that the version information has not changed, in response to the version information of the data stored in the memory of the home controller being equal to the version information of the data requested in the request.

19. The home controller of claim 17, wherein the processing system is further programmed to:

store, in the memory, an audit trail including version information for the data returned to the input controller and an identifier corresponding to the input controller, in response to responding to the request;
compare a subsequent request with the audit trail; and
negate sending the data requested in the subsequent request, in response to the subsequent request being for data which the audit trail indicates was previously returned to the input controller when the version information for the data currently in the home controller is equal to the version information stored in the audit trail.

* * * * *